Aug. 5, 1947.   C. W. WILSON   2,425,291
ALKYLATED CHALCONE DERIVATIVES AND METHODS OF PREPARING THE SAME
Filed March 3, 1944

1 | AS SOURCE MATERIALS FLAVANONE GLYCOSIDES | — as HESPERIDIN

2 | CONVERT TO CHALCONE WITH STRONG ALKALI | — as 20% NaOH

3 | ADD ALKYLATING AGENT | — as DIMETHYL SULFATE

4 | COOL AND AJUST TO pH 5 | — as WITH $H_2SO_4$ OR NaOH

5 | EXTRACT WITH SOLVENT | — as BUTYL ALCOHOL

6 | WASH EXTRACTS | — as WITH DISTILLED WATER

7 | EVAPORATE TO DRYNESS | — as UNDER VACUUM

INVENTOR
CLARENCE WALTER WILSON
by Robert E. Harris
ATTORNEY

Patented Aug. 5, 194.

2,425,291

UNITED STATES PATENT OFFICE 2,425,291

ALKYLATED CHALCONE DERIVATIVES AND METHODS OF PREPARING THE SAME

Clarence Walter Wilson, Norco, Calif., assignor to California Fruit Growers Exchange, Los Angeles, Calif., a corporation of California Application March 3, 1944, Serial No. 524,870

12 Claims. (Cl. 260—210)

This invention relates more particularly to substances having physiological and therapeutic properties and to methods of preparation of the same, being broadly directed to alkoxyl substituted chalcone glycosides derived from the corresponding flavanone glycosides and being more specifically and especially directed to a methylated chalcone of hesperidin; these being, especially the latter, substances which are apparently capable of having physiological activity, e. g., of reducing, or at least inducing the reduction of, capillary fragility and/or capillary permeability.

Accordingly, this invention has as an object the preparation of alkoxyl substituted chalcone glycosides derived from the corresponding flavanone glycosides.

It has as a further object the preparation from flavanone glycosides of substances which are acid stable, water soluble, and physiologically active.

It is a further object of this invention to prepare alkylated derivatives of the chalcones derived from citrus flavanone glycosides.

These and further objects and advantages will appear more fully to those skilled in the art from a consideration of the invention as set forth in the following description and in the appended claims. A precise nature of my invention and a specific embodiment thereof will be clear from the following detailed example, after the description of which I shall indicate a broader ambit within which the principles involved may be operable and shall delineate theoretical considerations which may be implied.

The drawing is a flow sheet containing an illustrative showing of my preferred process.

As a source material, for a preferred embodiment I choose to take hesperidin, indicated at 1. The preparation of the methylated chalcone of hesperidin may then be carried on as follows: The hesperidin is converted to the corresponding chalcone form by being dissolved in a sufficient quantity of 20% sodium hydroxide solution, indicated at 2. To this solution there is added, dropwise on a small scale, or in equivalent manner on a larger scale, and with agitation, the desired amount of dimethyl sulfate. This is step 3 of the flow sheet shown in the drawing. I have found it suitable to base the amounts of reactants used on the following as a molar relationship. The molecular weight of hesperidin is taken as 610. For each one-fourth mole of hesperidin, I may use one mole of sodium hydroxide and one mole of dimethyl sulfate. This quantity relationship of the reactants provides sufficient alkali to dissolve the hesperidin and to form the chalcone derivative and adequate dimethyl sulfate to effect methylation of the chalcone. I may add, during the addition of the methylating agent, some further relatively small quantities of alkali, since I find it preferable to maintain at least a fairly definite alkalinity during the methylation procedure under these conditions. After a period the mixture is cooled and adjusted to below neutrality, and suitably to about pH 5.0, by the addition of sulfuric acid, indicated at 4 in the drawing.

At this point a volume of butyl alcohol, suitably equal to the volume of the mixture, is added, step 5, during which agitation is desirably continued. The butyl alcohol is then separated from the mixture by known means, as for example, by any apparatus which has a function equivalent to that of a separatory funnel. The butyl alcohol extraction is desirably repeated several times to improve recovery, each time preferably using lesser volumes of the alcohol. These alcohol extractions are combined and washed with distilled water, step 6, to remove contaminating salt and acid. The solution of methylated hesperidin chalcone is then evaporated to dryness under reduced pressure, step 7.

It will be obvious to those skilled in the art of chemical processes such as herein disclosed, that the amounts, or volumes, of reagents used in the process under consideration are intimately related to the economics of the process, and accordingly they vary therewith. For example, when alcohol is used in the present process only that amount will be used which is necessary to obtain the desired effect, since the use of more than the necessary amounts serves only to increase the cost of manufacture.

The dried residue may be further purified if required. To accomplish this it is dissolved in methyl alcohol and the methyl chalcone of hesperidin is suitably precipitated therefrom by the addition of an amount of cold absolute isopropyl alcohol equal to about 4 or 5 times the volume of methyl alcohol used to dissolve the methyl chalcone. The resulting precipitate is filtered from the mother liquor and dried, preferably first in a vacuum chamber and finally in a drying oven at about 40 to 50° C.

The process outlined above gives a relatively pure product, but I have found that some quantities of the methyl chalcone of hesperidin are likely to be lost in the latter part of the process described because of the solubility of the methylated chalcone in the water phase during the butyl alcohol extraction. As an alternative method, therefore, I have found that the process may advantageously be carried on as above, to and including the step of adjusting the pH of the reaction mixture to below neutrality. The mixture is then vacuum concentrated to a heavy syrup. This syrup is then cooled and sufficient absolute methyl alcohol is added to it to extract or remove the methylated chalcone from the salts. This extraction may be assisted by gently warming the mixture. The extract is separated and allowed to stand for a time sufficient to permit crystallization of salts. These crystals are then filtered from the solution. The filtered solution is then concentrated to about one-third of its original volume and to this is added with rapid agitation about 4 volumes of cold absolute isopropyl alcohol. The yellow precipitate of methyl chalcone is filtered therefrom and dried as above. An additional quantity of the chalcone may be obtained by evaporating the alcoholic mother liquor to dryness under vacuum.

The methyl chalcone of hesperidin is a yellow substance readily soluble in water, in methyl alcohol, and in acetone, and slightly soluble in absolute isopropyl alcohol, or normal butyl alcohol. It is almost insoluble in either benzene or petroleum ether. It is relatively stable and retains its physiological activity well. It does not revert to hesperidin when sterilized in neutral or slightly acid solutions or under other conditions which cause reversion of hesperidin chalcone.

As mentioned hereinabove, the methylated chalcone of hesperidin is useful to reduce capillary fragility and/or capillary permeability and is useful for other therapeutic purposes. In addition to the application of this flavanone-like substance in reducing capillary fragility and/or permeability, it may also serve as a valuable adjuvant in the intensive arsenical therapy in syphilis. It seems that, in particular, the use of the methyl chalcone of hesperidin offsets the complications encountered in the arsenical therapy in syphilis. Heretofore the intensive short-time treatment of syphilis by the use of arsenical compounds has been limited due to the inability of the patient to tolerate the extremely large dosages. It now is apparent that by the use of an alkylated chalcone derivative of a flavanone, the patient may be protected against the complications inherent in the larger dosages. These facts are of inestimable value in the control of this disease.

I therefore regard the methyl hesperidin chalcone as the most immediately promising specific embodiment of my invention.

For the sake of clarity, I shall, in considering the broader aspects of the applicability of the principles involved in my processes, refer by numbers to the portions thereof indicated by corresponding numbers in the flow sheet.

Step 1

I find as suitable starting materials for the preparation of my desired products the flavanone glycosides, particularly those occurring in citrus. Of these, the two most commonly identified have been hesperidin and naringin.

Hesperidin has the empirical formula $C_{28}H_{34}O_{15}$ and can now with little or no doubt be assigned the following structural formula:

Hesperidin

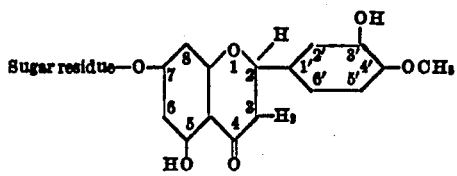

In this formula the sugar residue contains one molecule of rhamnose and one molecule of glucose. Hesperidin is a natural glycoside apparently occurring in most citrus fruits. While perhaps the most prolific source of hesperidin is the albedo of the citrus fruit, some has been found in the juice portion of the fruit, and traces have also been found in the leaves, twigs and bark of citrus trees. This flavanone glycoside has been reported as occurring rather widely in nature. However, the definite possibility exists that the identification was not sufficiently certain in all cases and that in some of these instances, at least, other but closely related substances were reported as hesperidin.

Naringin is a natural glycoside having the empirical formula $C_{27}H_{32}O_{14}$ and apparently having the structural formula:

Naringin

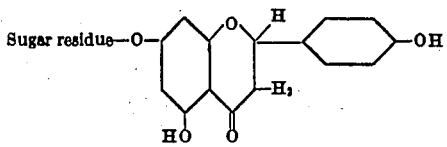

It apparently differs from hesperidin only in the absence of the methoxyl group at the 4' position and the shift of the hydroxyl group to this position. One of the most prolific sources is the peel and rag of the grapefruit. It is also reported to occur in relatively large quantities in the leaves. This glycoside seems so far only to have been reported as obtained from the grapefruit, which is variously identified as *Citrus grandis*, Osbeck, and *Citrus decumana*, Linn. (The Standard Cyclopedia of Horticulture, by L. H. Bailey, The MacMillan Company, 1935) and identified as derived from *Citrus maxima* (Webster's New International Dictionary, second edition). One recent worker has reported naringin as appearing in Indian shaddock, which is apparently a clearly distinguished variety of *Citrus maxima* (Webster's New International Dictionary, second edition).

Eriodictin (also referred to as eriodictyol glycoside), which is so far only reported as occurring in lemon peel, appears not to have been definitely identified as to structure but may be presumed to have the empirical formula $C_{27}H_{32}O_{15}$ and the structural formula:

Eriodictin

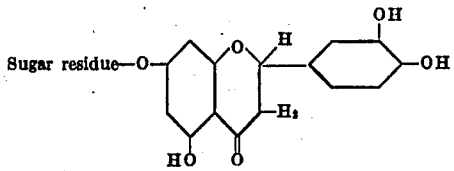

Eriodictin according to this view, is theoretically capable of being formed by the demethylation of hesperidin.

Citronin, with the empirical formula $C_{28}H_{34}O_{14}$, and the probable structural formula:

Citronin

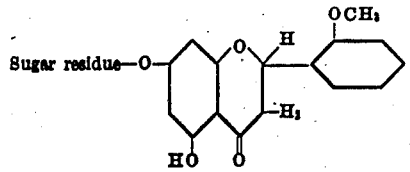

in which the sugar residue is apparently a rhamnoglucoside, as in hesperidin, and in which there is some question as to whether the methoxyl group, —$OCH_3$, is in the 2' or the 3' position, is obtained from the peel of lemon ponderosa, *Citrus limon*. Burm. *f. ponderosa* Hort.

Neohesperidin, isolated from bitter oranges, apparently has the same empirical formula as hesperidin, $C_{28}H_{34}O_{15}$, having also an identical aglycon and the same sugar groups united thereto, but appearing to have these bound differently, the substance possibly having the following structural formula:

*Neohesperidin*

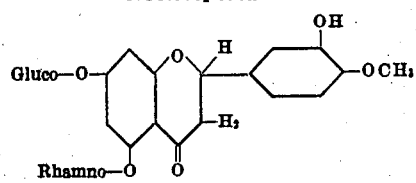

It is thus seen that the principal commercial sources of the flavanone glycosides are citrus fruits.

Sakuranin, having the empirical formula $C_{22}H_{24}O_{10}$, and the probable structural formula:

*Sakuranin*

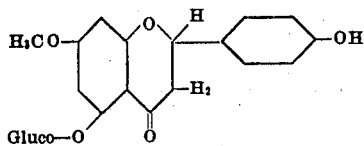

has been isolated from the bark of the *Prunus yedoensis* Matsumura.

Liquiritin, with the empirical formula $C_{21}H_{22}O_9$, and the apparent structural formula:

*Liquiritin*

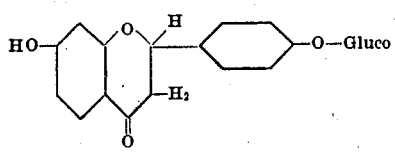

is obtained from the root of the licorice, *Glycyrrhiza glabra* L. var. *glandulifera*.

STEP 2

Substances which produce strongly alkaline aqueous solutions are employed. I prefer the alkali metal hydroxides and the alkaline earth hydroxides. The general order of alkalinity suitable is indicated by the use of 20% NaOH in the specific example. Whatever reagent is employed must have adequate alkalizing effect. And enough of it must be employed for this purpose and to satisfy the reaction requirements of the quantities of the other reagents employed, for example, the dimethyl sulfate.

In starting with the flavanone glycosides, and in operating upon, as a specific example, hesperidin, the solution in the strong alkali performs the important function of converting the flavanone to hesperidin chalcone. This may be considered as converting the compound from the structural formula given first above to a compound having the following structural formula:

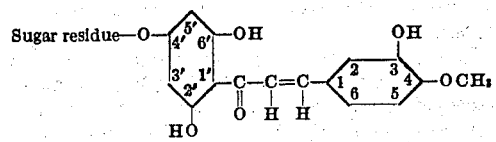

It will be at once observed that this formula exhibits three phenolic hydroxyl groups; and it is to be assumed that the solution in strong alkali causes these to exist actually as phenolates. It is possible however, by careful manipulation, to recover a portion of the hesperidin chalcone as such, without having caused therein the closing again of the ring.

It has been found that the pure hesperidin, which is almost water insoluble, though considered by some to be physiologically active, does not exhibit marked effects on either the blood pressure or the fragility of capillaries. This lack of activity may be due to the water insolubility of the pure hesperidin. However, the chalcone prepared from the pure hesperidin is active. This latter substance is not, however, suitable for administration by injection because of the impossibility of sterilizing such solutions without causing closing of the ring, which brings about precipitation of hesperidin. Hesperidin chalcone, which gives a relatively neutral solution, easily reverts to hesperidin on heating in neutral water solution or even on long storage in the dry state, thus it is too unstable for pharmaceutical use. Other water soluble forms of hesperidin such as the alkali and alkaline earth salts while readily soluble, yield solutions having a pH of 10.0 or higher.

It appeared, therefore, that even though the nature and chemical constitution of the substances which are physiologically active to reduce capillary fragility and/or permeability were known, no satisfactory means of using the substances, except perorally, was heretofore available or known.

I have found, however, that the chalcone of hesperidin may be modified in a manner which apparently does not impair its physiological activity but which will make it adaptable for pharmaceutical and therapeutic uses. I accomplish this by the alkylation process herein described.

STEP 3

Since I intend my products to be suitable for use in the animal body, i. e., for treatment of bodily disorders, I prefer to make the end products water soluble; and indeed I ordinarily perform the process in aqueous solution. Therefore I prefer to use the lower members of the homologous series as alkylating agents.

My end product strongly resists, or does not exhibit at all, the usual tendency of the chalcone to undergo the ring closure reaction. This tendency is normally exhibited when the chalcone has been freed from the alkali which was attached to it in the so-called "salt" or phenolate form. This tendency, which is present in neutral solutions, becomes much more noticeable in slightly acid solutions, especially with gentle warming. The strong resistance which my products exhibit to undergoing the ring closure in neutral or acid solutions, I refer to herein and in the appended claims as being "acid stable." Since the methylated hesperidin chalcone possesses this property, it may be presumed that the product has assumed the following structure:

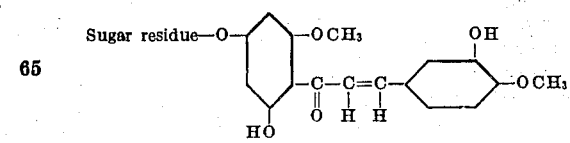

In this formula the methoxyl group is shown as arising from conversion of the hydroxyl group at the 6' position, which hydroxyl was newly formed at the conversion from the flavanone to the chalcone. I do not, however, mean to imply that the alkylation is necessarily limited to the 6' position, since obviously alkylation may also be effected at the 2' position or the 3 position, as well as in the sugar residue. Furthermore, since, as indicated, I am particularly interested in the water solubility of the alkylated product, I do not choose to alkylate to such an extent that, or to add those alkyl groups which contain a sufficiently large number of carbon atoms that, the solubility of the resulting compound will be materially reduced. Also, I wish to point out that alkylation may be effected by the addition of different alkoxyl groups, that is for example, I may methylate and ethylate simultaneously or successively, thereby adding methoxyl and ethoxyl groups at the positions occupied by the hydroxyl groups in the hesperidin chalcone molecule or other chalcone.

Dimethyl sulfate has been given above as an example of a methylating agent which has been highly successful in this particular relationship. Obvious equivalents for putting in methoxyl or other alkoxyl groups are intended to be included. Alkyl halides are known agents for this purpose. Diazomethane is also a recognized agent for this purpose. It is used in non-aqueous systems, for example, in ether, which is not, however, a good solvent for hesperidin.

I wish to emphasize at this point that I prefer in adding the alkylating agent to add it at such a rate and under such other conditions, for example with agitation, as will avoid destructive temperature rise and will also avoid local over-concentration of the reagent.

STEP 4

The cooling may be done in any convenient manner.

The pH adjustment will ordinarily be done with an acid. Sulfuric is indicated in the preferred example as being in all respects compatible with the other components of the reaction system. Where alkalinity has not been maintained up to the end of the alkylation but the system has been allowed to drift over definitely to the acid side, it may be necessary at this point to add alkali to adjust the pH to about 5.

STEP 5

Butyl alcohol is chosen for the specific example because it possesses in good degree the desired properties. Important among these properties are good solvent action on the desired end product of the reaction, low solvent action on any undesired end products, and low solubility of the solvent itself in water. Apparently the solvent must be of an oxygenated type to dissolve the product.

STEP 6

The washing step may perhaps be only slightly preferred, and as a matter of convenience. As pointed out above, a little of the product will be lost at this stage; but this under usual circumstances will probably be worth while nevertheless, as getting rid of impurities, salts, etc.

STEP 7

The drying may be conducted in any convenient manner. The solvent being volatile under these conditions, the drying step is practiced as giving a total recovery of the dissolved product.

Having thus disclosed my invention in such full, clear, concise, and exact language as to enable others skilled in the art to make, use, and compound the same, I claim as my invention and desire to secure by Letters Patent the following:

1. An acid stable, water soluble chalcone glycoside having the following general formula:

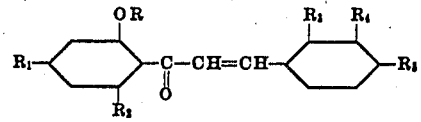

wherein R is a lower alkyl group, R₁, R₂ and R₄ are selected from the group consisting of hydrogen, hydroxyl, lower alkoxyl, glycoside and lower alkoxylated glycoside residues, and at least one thereof being selected from the group consisting of glycoside and lower alkoxylated glycoside residues, and R₃ and R₄ are selected from the group consisting of hydrogen, hydroxyl, and lower alkoxyl.

2. The products defined in claim 1 wherein R is a methyl group, R₁, R₂ and R₄ are selected from the group consisting of hydrogen, hydroxyl, methoxyl, glycoside and methylated glycoside residues, and at least one thereof being selected from the group consisting of glycoside and methylated glycoside residues, and R₃ and R₄ are selected from the group consisting of hydrogen, hydroxyl, and methoxyl.

3. An acid stable, water soluble chalcone glycoside having the following general formula:

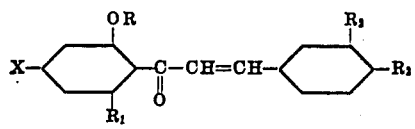

wherein R is a lower alkyl group and R₁, R₂, and R₃ are selected from the group consisting of hydroxyl and lower alkoxyl groups and X is selected from the group consisting of glycoside residues and lower alkoxylated glycoside residues.

4. The products defined in claim 3 wherein R is a methyl group and R₁, R₂, and R₃ are selected from the group consisting of hydroxyl and methoxyl, and X is selected from the group consisting of glycoside residues and methylated glycoside residues.

5. An acid stable, water soluble chalcone glycoside having the following general formula:

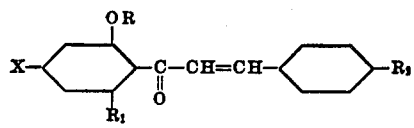

wherein R is a lower alkyl group and R₁, R₂ are selected from the group consisting of hydroxyl and lower alkoxyl groups and X is selected from the group consisting of glycoside residues and lower alkoxylated glycoside residues.

6. The products of claim 5 wherein R is a methyl group and R₁ and R₂ are selected from the group consisting of hydroxyl and methoxyl groups and X is selected from the group consisting of glycoside residues and methylated glycoside residues.

7. A process for preparing the products defined in claim 1 which comprises dissolving a flavanone glycoside in a strongly alkaline solution to convert the flavanone to a chalcone phenolate and adding an alkylating agent to the solution of the phenolate to form lower alkoxyl groups therein, and recovering the alkylated chalcone.

8. A method for preparing the products defined in claim 2 which comprises dissolving a flavanone glycoside in a strongly alkaline solution to convert the flavanone to a chalcone phenolate and adding a methylating agent to the solution of the phenolate to form methoxyl groups therein, and recovering the methoxylated chalcone.

9. A method for preparing the products defined in claim 3 which comprises dissolving hesperidin in a strongly alkaline solution to convert the hesperidin to chalcone form in solution as a phenolate and adding an alkylating agent to the solution of the phenolate to convert at least one of the phenolic groups to lower alkoxyl groups and recovering the alkylated chalcone.

10. A process for preparing the compounds defined in claim 4 which comprises dissolving hesperidin in a strongly alkaline solution to convert the hesperidin to chalcone form in solution as a phenolate and adding a methylating agent to the solution of phenolate to convert at least one of the phenolic groups to methoxyl and recovering the methylated chalcone.

11. A process for preparing the products defined in claim 5 which comprises dissolving naringin in a strongly alkaline solution to convert the naringin to chalcone form in solution as a phenolate and adding an alkylating agent to the solution of the phenolate to convert at least one of the phenolic groups to lower alkoxyl groups and recovering the alkylated chalcone.

12. A process for preparing the compounds defined in claim 6 which comprises dissolving naringin in a strongly alkaline solution to convert the naringin to chalcone form in solution as a phenolate and adding a methylating agent to the solution of phenolate to convert at least one of the phenolic groups to methoxyl and recovering the methoxylated chalcone.

CLARENCE WALTER WILSON.

REFERENCES CITED

The following references are of record in the file of this patent:

Chemical Abstracts, vol. 9, pages 1317, 1318. (Copy in U. S. Patent Office, Scientific Library, Washington, D. C.)

Chemical Abstracts, vol. 20, page 593$^2$. (Copy in U. S. Patent Office, Scientific Library, Washington, D. C.)